(12) United States Patent
Chang et al.

(10) Patent No.: US 8,345,177 B2
(45) Date of Patent: Jan. 1, 2013

(54) VIA DESIGN FOR USE IN DISPLAYS

(76) Inventors: Shih Chang Chang, Cupertino, CA (US); Shawn Robert Gettemy, San Jose, CA (US); Ming Xu, Cupertino, CA (US); Cheng Chen, Cupertino, CA (US); Mingxia Gu, Santa Clara, CA (US); John Z Zhong, Cupertino, CA (US)

(*) Notice: Subject to any disclaimer, the term of this patent is extended or adjusted under 35 U.S.C. 154(b) by 994 days.

(21) Appl. No.: 12/371,284

(22) Filed: Feb. 13, 2009

(65) Prior Publication Data

US 2010/0207860 A1 Aug. 19, 2010

(51) Int. Cl.
*G02F 1/136* (2006.01)
(52) U.S. Cl. .............................. 349/43; 349/42
(58) Field of Classification Search ............... 349/110, 349/42–43
See application file for complete search history.

(56) References Cited

U.S. PATENT DOCUMENTS

| | | |
|---|---|---|
| 4,991,115 A | 2/1991 | Guthrie et al. |
| 5,396,351 A | 3/1995 | Gessel |
| 5,450,222 A | 9/1995 | Sirkin |
| 5,659,378 A | 8/1997 | Gessel |
| 6,157,426 A | 12/2000 | Gu |
| 6,285,431 B2 | 9/2001 | Lyu |
| 6,433,933 B1 | 8/2002 | Gettemy |
| 6,466,285 B1 | 10/2002 | Ichikawa |
| 6,466,290 B2 | 10/2002 | Kim |
| 6,536,933 B1 | 3/2003 | Gettemy et al. |
| 6,545,862 B1 | 4/2003 | Gettemy et al. |
| 6,603,469 B1 | 8/2003 | Gettemy et al. |
| 6,618,044 B1 | 9/2003 | Gettemy et al. |
| 6,642,985 B2 | 11/2003 | Kim |
| 6,685,328 B1 | 2/2004 | Hanson et al. |
| 6,700,560 B2 | 3/2004 | Sumiya |
| 6,710,754 B2 | 3/2004 | Hanson et al. |
| 6,718,115 B1 | 4/2004 | Gettemy et al. |
| 6,741,314 B2 | 5/2004 | Song |
| 6,859,244 B2 | 2/2005 | Kawase et al. |
| 6,888,532 B2 | 5/2005 | Wong et al. |
| 6,919,681 B2 | 7/2005 | Cok |
| 6,924,752 B2 | 8/2005 | Gettemy et al. |
| 6,924,863 B2 | 8/2005 | Nishida |
| 6,947,017 B1 | 9/2005 | Gettemy |
| 6,961,029 B1 * | 11/2005 | Canova et al. .................. 345/55 |
| 6,965,375 B1 | 11/2005 | Gettemy et al. |
| 6,992,659 B2 | 1/2006 | Gettemy |

(Continued)

FOREIGN PATENT DOCUMENTS

JP 2001092382 4/2001

(Continued)

OTHER PUBLICATIONS

U.S. Appl. No. 12/371,316, filed Feb. 13, 2009, Chang et al.

(Continued)

*Primary Examiner* — Nathanael R Briggs
(74) *Attorney, Agent, or Firm* — Fletcher Yoder PC (57) ABSTRACT

A liquid crystal display (LCD) is provided having transistors disposed within via holes having elongated (e.g., rectangular or oval) contact areas. The use of via holes having elongated contact areas allows an opaque mask defining an aperture for light transmission to be lengthened, thereby increasing the overall area of the aperture. The increase in the area of the aperture may increase the amount of light that can pass through the aperture.

18 Claims, 5 Drawing Sheets

U.S. PATENT DOCUMENTS

| | | |
|---|---|---|
| 7,002,569 B1 | 2/2006 | Gettemy et al. |
| 7,006,080 B2 | 2/2006 | Gettemy |
| 7,034,802 B1 | 4/2006 | Gettemy et al. |
| 7,048,401 B2 | 5/2006 | Lee et al. |
| 7,057,579 B2 | 6/2006 | Hanson et al. |
| 7,057,698 B2 | 6/2006 | Chung |
| 7,068,256 B1 | 6/2006 | Gettemy et al. |
| 7,079,119 B2 | 7/2006 | Hanson et al. |
| 7,091,964 B2 | 8/2006 | Wong et al. |
| 7,095,387 B2 | 8/2006 | Lee et al. |
| 7,159,194 B2 | 1/2007 | Wong et al. |
| 7,167,309 B2 | 1/2007 | Saxena |
| 7,203,075 B2 | 4/2007 | Terada et al. |
| 7,248,271 B2 | 7/2007 | Credelle |
| 7,248,320 B2 | 7/2007 | Hirakata |
| 7,256,767 B2 | 8/2007 | Wong et al. |
| 7,268,775 B1 | 9/2007 | Gettemy |
| 7,304,707 B2 | 12/2007 | Son |
| 7,324,093 B1 | 1/2008 | Gettemy et al. |
| 7,339,639 B2 | 3/2008 | Nakano et al. |
| 7,342,571 B2 | 3/2008 | Fraser et al. |
| 7,348,964 B1 | 3/2008 | Gettemy et al. |
| 7,349,052 B2 | 3/2008 | Wu et al. |
| 7,362,338 B1 | 4/2008 | Gettemy et al. |
| 7,379,143 B2 | 5/2008 | Lyu |
| 7,425,970 B1 | 9/2008 | Gettemy et al. |
| 7,466,373 B2 | 12/2008 | Xu et al. |
| 7,483,016 B1 | 1/2009 | Gettemy et al. |
| 2003/0098857 A1 | 5/2003 | Gettemy et al. |
| 2003/0160755 A1 | 8/2003 | Gettemy et al. |
| 2004/0046739 A1 | 3/2004 | Gettemy |
| 2004/0085503 A1 | 5/2004 | Kim |
| 2005/0139837 A1 | 6/2005 | Lee |
| 2005/0184974 A1 | 8/2005 | Gettemy et al. |
| 2005/0212999 A1 | 9/2005 | Yang |
| 2005/0269580 A1 | 12/2005 | D'Angelo |
| 2006/0018175 A1 | 1/2006 | Liljedahl |
| 2006/0066805 A1 | 3/2006 | Grunnet-Jepsen |
| 2006/0114393 A1* | 6/2006 | Sawasaki et al. ............ 349/138 |
| 2006/0197740 A1 | 9/2006 | Xu et al. |
| 2006/0203169 A1 | 9/2006 | Ozawa |
| 2006/0232553 A1 | 10/2006 | Wong et al. |
| 2006/0256264 A1 | 11/2006 | Yang |
| 2006/0268560 A1 | 11/2006 | Wong et al. |
| 2006/0279557 A1 | 12/2006 | Gettemy |
| 2006/0284895 A1 | 12/2006 | Marcu et al. |
| 2007/0024583 A1 | 2/2007 | Gettemy et al. |
| 2007/0052617 A1 | 3/2007 | Hanson et al. |
| 2007/0069975 A1 | 3/2007 | Gettemy et al. |
| 2007/0070272 A1 | 3/2007 | Gettemy et al. |
| 2007/0070282 A1 | 3/2007 | Shibahara |
| 2007/0115417 A1 | 5/2007 | Ge |
| 2007/0139586 A1 | 6/2007 | Gu et al. |
| 2007/0152963 A1 | 7/2007 | Wong et al. |
| 2007/0222927 A1 | 9/2007 | Uehara |
| 2007/0229475 A1 | 10/2007 | Gettemy et al. |
| 2007/0229749 A1 | 10/2007 | Kaneko |
| 2007/0252937 A1* | 11/2007 | Suzuki et al. ............... 349/141 |
| 2007/0273714 A1 | 11/2007 | Hodge et al. |
| 2007/0290989 A1 | 12/2007 | Gettemy et al. |
| 2007/0296693 A1 | 12/2007 | Wong et al. |
| 2008/0007681 A1* | 1/2008 | Chen et al. ................... 349/129 |
| 2008/0032755 A1 | 2/2008 | Fraser et al. |
| 2008/0036948 A1 | 2/2008 | Zhong et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0068549 A1 | 3/2008 | Liao |
| 2008/0074400 A1 | 3/2008 | Gettemy et al. |
| 2008/0083569 A1 | 4/2008 | Gettemy et al. |
| 2008/0117184 A1 | 5/2008 | Gettemy |
| 2008/0121898 A1 | 5/2008 | Yin et al. |
| 2008/0137018 A1 | 6/2008 | Lin |
| 2008/0143946 A1 | 6/2008 | Wang |
| 2008/0164056 A1 | 7/2008 | Gettemy et al. |
| 2008/0180801 A1 | 7/2008 | Kobayashi |
| 2008/0186440 A1* | 8/2008 | Lim et al. .................... 349/141 |
| 2008/0204431 A1 | 8/2008 | Chung et al. |
| 2008/0225217 A1 | 9/2008 | Wakabayashi |
| 2008/0231959 A1 | 9/2008 | Grip |
| 2008/0238813 A1 | 10/2008 | Gettemy et al. |
| 2008/0246726 A1 | 10/2008 | Gettemy |
| 2008/0259254 A1 | 10/2008 | Kikuchi |
| 2008/0303998 A1 | 12/2008 | Ohta |
| 2008/0309627 A1 | 12/2008 | Hotelling et al. |
| 2008/0309633 A1 | 12/2008 | Hotelling et al. |
| 2009/0009442 A1 | 1/2009 | Galbraith, Jr. et al. |

FOREIGN PATENT DOCUMENTS

| | | |
|---|---|---|
| KR | 2004061426 | 7/2004 |
| WO | 2008077261 | 7/2008 |

OTHER PUBLICATIONS

U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,409, filed Feb. 13, 2009, Chen et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.
Jung, Byunghoo, et al.; "Improved aperture Ration Through Assymetric Pixel Electrode Design"; Feb. 13, 1997.

* cited by examiner

VIA DESIGN FOR USE IN DISPLAYS

BACKGROUND

1. Technical Field

Embodiments of the present disclosure relate generally to vias used in displays, such as liquid crystal displays.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

The performance of an LCD may be measured with respect to a variety of factors. For example, the brightness of the display, the visibility of the display when viewed at an angle, the refresh rate of the display, and various other factors may all describe an LCD and/or determine whether a display will be useful in the context of a given device. For example, with respect to brightness, factors which may affect the brightness of a display include the area available to transmit light at each picture element (i.e., pixel) of the display. Likewise, another factor that may influence the brightness of an LCD may be the manner in which the liquid crystals forming the display are modulated. In particular, such modulation of the liquid crystals determines the amount of light transmitted by a pixel at a given time and artifacts, discontinuities, or irregularities in the fields affecting the liquid crystals may affect the perceived brightness of a pixel.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present disclosure relates to increasing the light transmission of LCD pixels. In accordance with the present disclosure, an LCD pixel is formed on a substrate material. A respective via hole is formed for each pixel and a transistor structure is formed in the via hole to control operation of the respective pixel. In certain embodiments, the via hole is formed as a rectangle or other elongated shape. Use of such a rectangular or other elongated shape for the via hole allows the aperture in an overlying opaque mask to be lengthened, thereby increasing the area of the aperture. That is, a reduction of the length of the via hole in one dimension allows an increase in the length of the aperture in the same dimension without changing the overall pixel length in that dimension. The increased area of the aperture defined by the opaque mask in turn increases the amount of light that can be transmitted by the pixel.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to increasing light transmittance in LCD pixels. In certain embodiments, the increase in light transmittance may be accomplished by increasing the length of an aperture associated with each pixel, thereby increasing the total area of each aperture. This increase in the length of the apertures may be accomplished without increasing the length of each pixel by using an elongated or rectangular via hole in which an associated transistor for the pixel is formed. Thus, the elongated or rectangular via hole may be shorter in the dimension in which the pixel aperture is lengthened, thus allowing the pixel aperture to be lengthened without lengthening the overall pixel.

Figure 1:
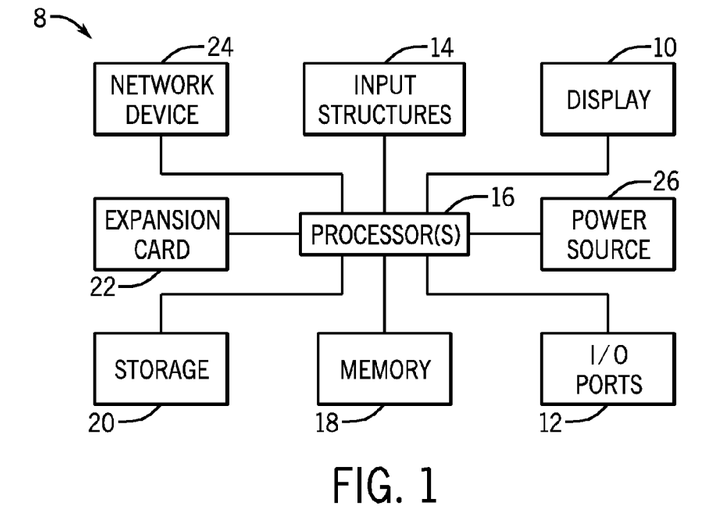
FIG. 1 is a block diagram of exemplary components of an electronic device, in accordance with aspects of the present disclosure.
Figure 2:
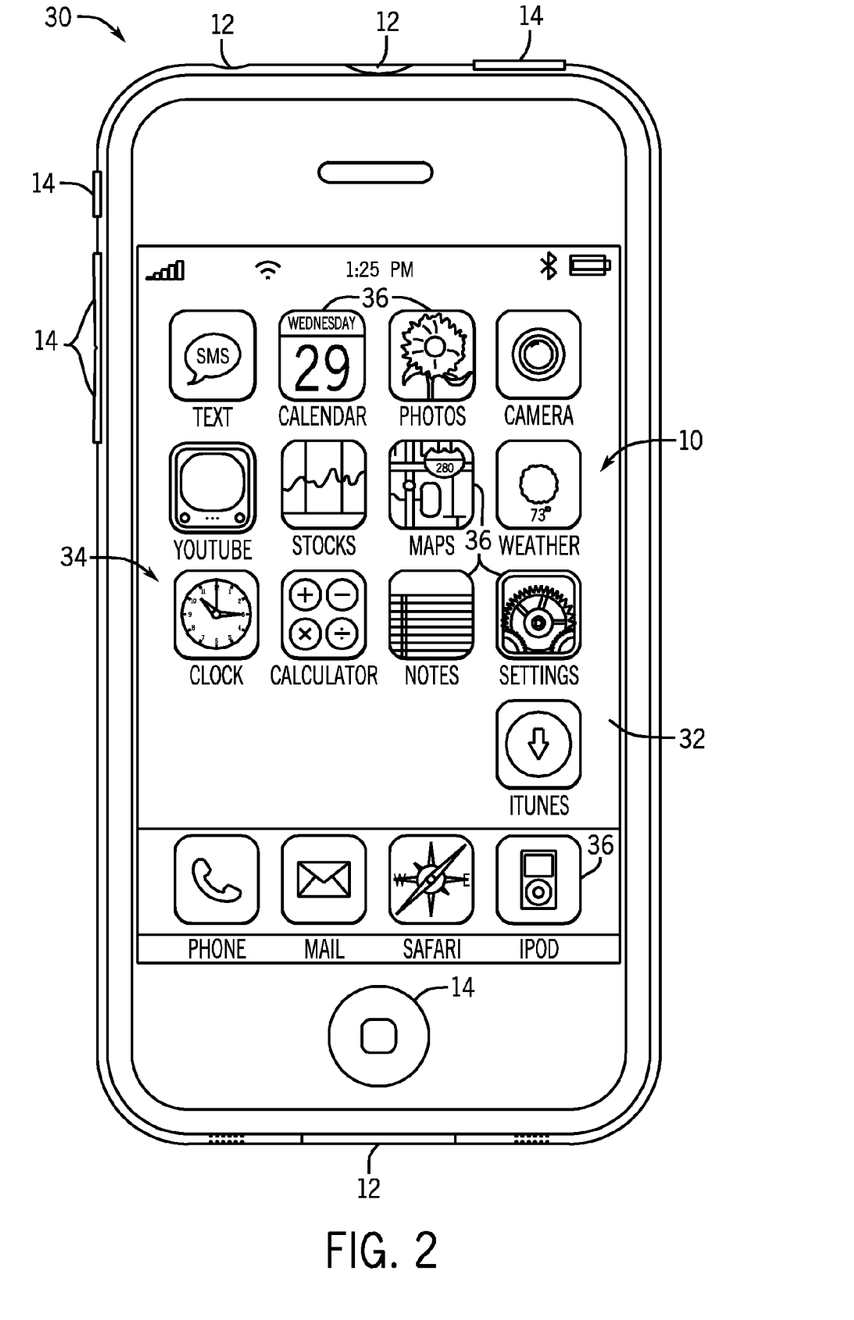
FIG. 2 is a front view of a handheld electronic device in accordance with aspects of the present disclosure.
Figure 3:
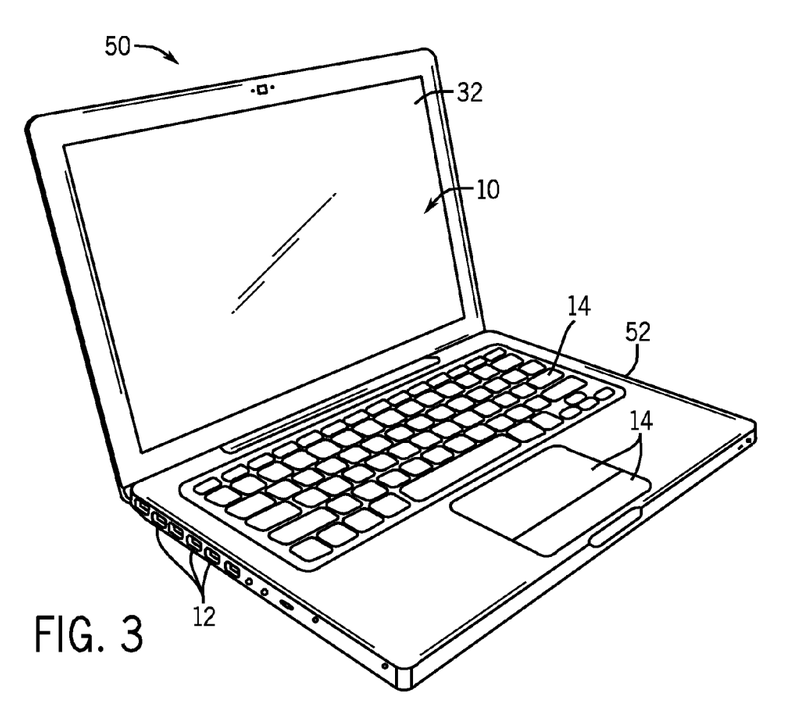
FIG. 3 is a view of a computer in accordance with aspects of the present disclosure.

With these foregoing features in mind, a general description of suitable electronic devices using LCD displays having such increased light transmittance is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card (s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with touch-sensitive element, such as a touch screen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touch-screen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in the form of either a handheld device 30 or a computer 50 may be provided with an LCD 32 as the display 10. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may include an array or matrix of picture elements (i.e., pixels). In operation, the LCD 32 generally operates to modulate the transmission of light through the pixels by controlling the orientation of liquid crystal disposed at each pixel. In general, the orientation of the liquid crystals is controlled by a varying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an electrical field that is generally in-plane to a layer of the liquid crystals. Example of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 4:
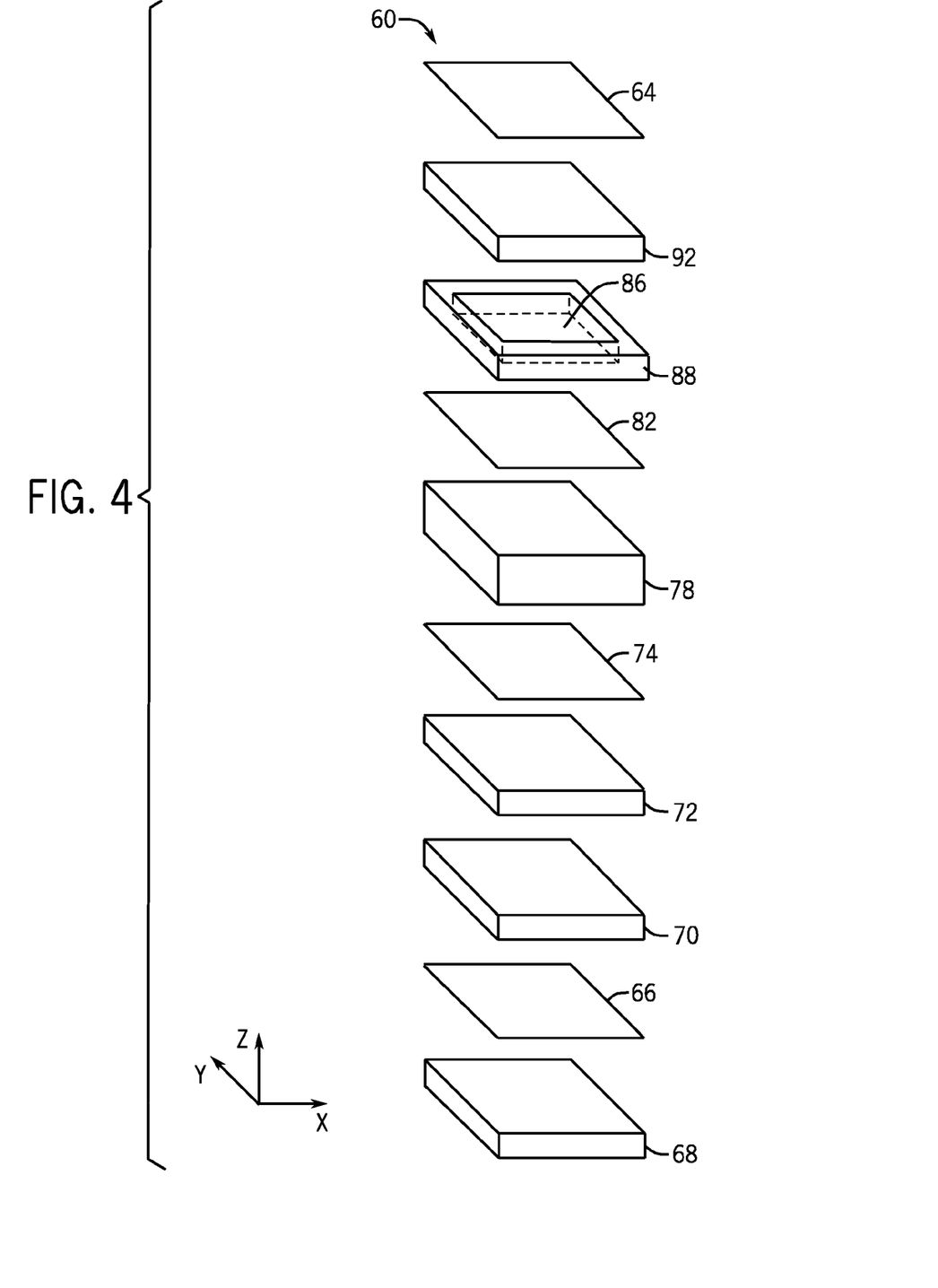
FIG. 4 is an exploded view of exemplary layers of a pixel of an LCD panel, in accordance with aspects of the present disclosure.

With the foregoing in mind, and turning once again to the figures, FIG. 4 depicts an exploded view of different layers of a pixel 60 of an LCD 32. The pixel 60 includes an upper polarizing layer 64 and a lower polarizing layer 66 that polarize light emitted by a backlight assembly 68 or light-reflective surface. A lower substrate 70 is disposed above the polarizing layer 66 and is generally formed from a light-transparent material, such as glass, quartz, and/or plastic.

A thin film transistor (TFT) layer 72 is depicted as being disposed above the lower substrate 70. For simplicity, the TFT layer 72 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 72 may include the respective data lines, scanning or gate lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 72 may include insulating layers (such as a gate insulating film) formed from suitable transparent materials (such as silicon oxide or silicon nitride) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 60, as described in further detail with regard to FIG. 5. An alignment layer 74 (formed from polyimide or other suitable materials) may be provided between the TFT layer 72 and an overlying liquid crystal layer 78.

The liquid crystal layer 78 includes liquid crystal molecules in a fluid shape or suspended in a polymer matrix. The liquid crystal molecules may be oriented or aligned with respect to an electrical field generated by the TFT layer 72. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 72 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate may be formed from light-transmissive glass, quartz, and/or plastic.

Figure 5:
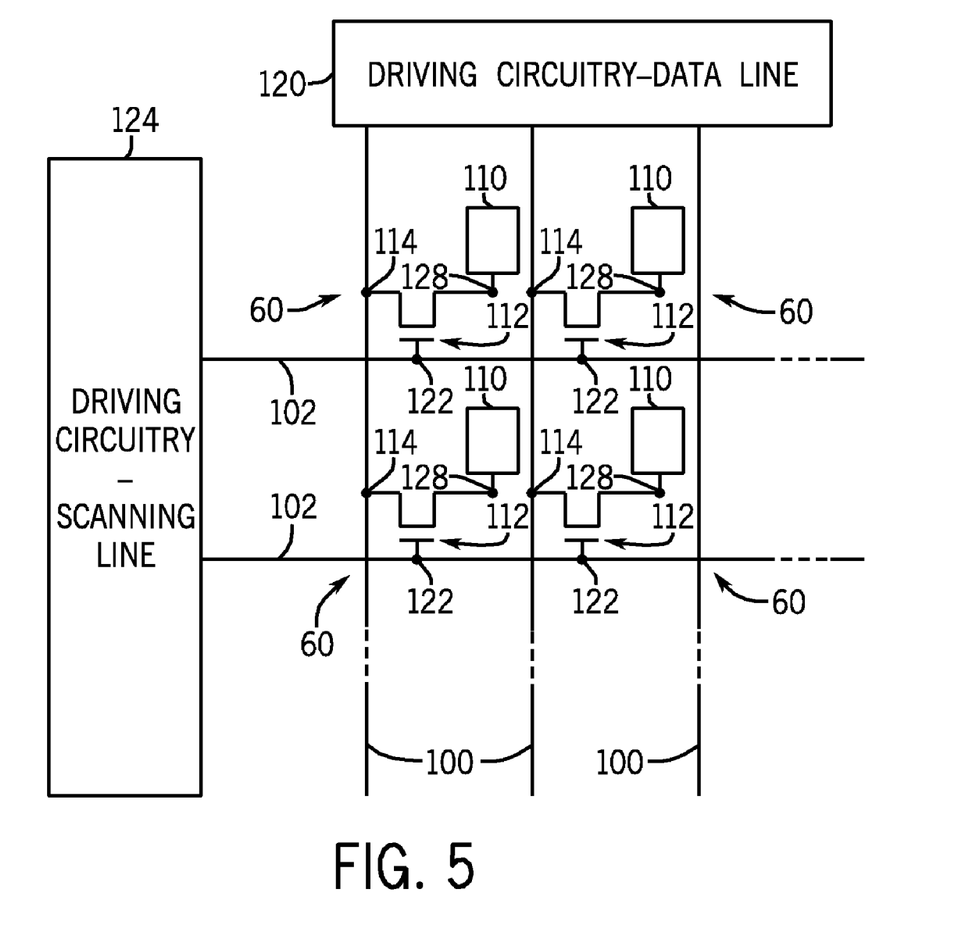
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided. For example, such circuitry as depicted in FIG. 5 may be embodied in the TFT layer 72 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Figure 6:
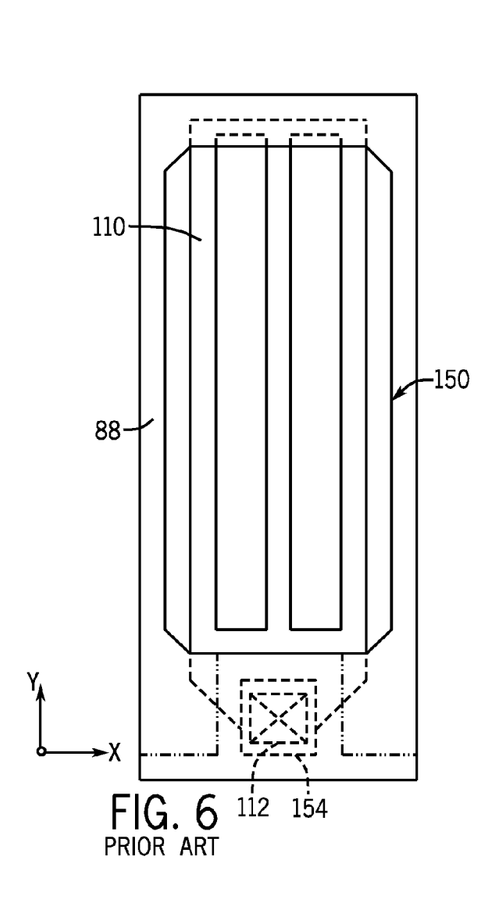
FIG. 6 is a plan view of an LCD pixel having a square via hole in accordance with the prior art.
Figure 7:
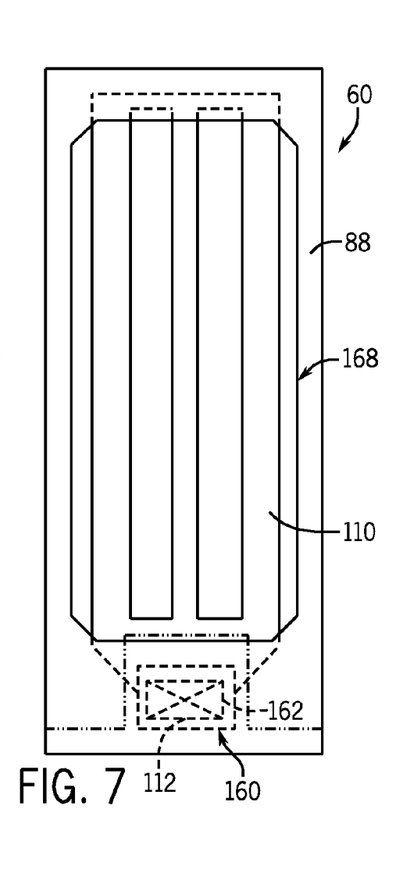
FIG. 7 is a plan view of an LCD pixel having an elongated via hole in accordance with a first embodiment of the present disclosure.
Figure 8:
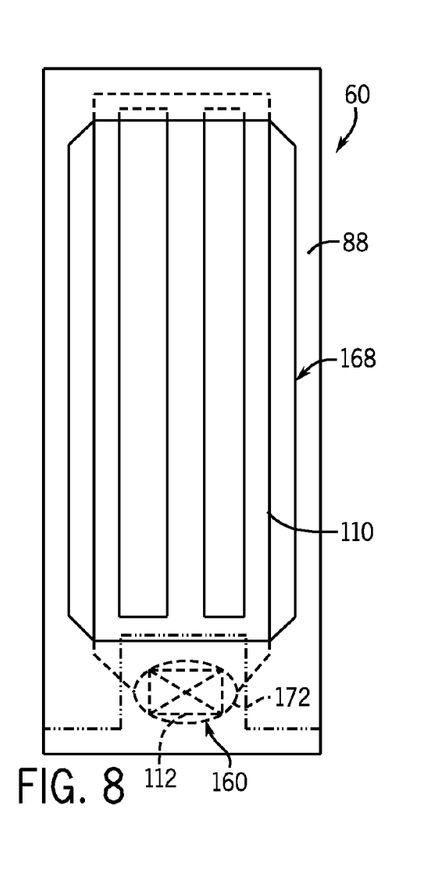
FIG. 8 is a plan view of an LCD pixel having an elongated via hole in accordance with a second embodiment of the present disclosure.

Turning now to FIGS. 6-8, plan views of pixels are provided. In FIG. 6, a prior art view of a pixel is provided depicting a transparent pixel electrode 110 and TFT 112 used as a switch for the pixel 60. A black mask 88 defines an aperture 150 through which light may be transmitted by the pixel 60. The black mask 88 may be formed from any suitable opaque material, such as opaque polymeric compositions (e.g., plastics), metals, and so forth.

In the depicted example, the black mask 88 also functions to mask or cover a square via hole 154 (i.e., a via hole having a square cross-section or contact area in the depicted x and y dimensions) in which the TFT 112 for the pixel 60 is formed. Such a via hole may be formed as a passage through one or more semi-conductive or insulating layers such that conductive structures on either side of the via may be electrically connected. For instance, in this example, the TFT 112 may be formed in the square via hole 154, such as by one or more suitable layer deposition techniques used to form integrated circuit devices. Thus, the via hole allows electrical interconnections to be formed between layers or structures otherwise separated by intervening non- or semiconductive layers.

The via hole 154 may be sized to provide sufficient conductivity through whatever intervening layers or structures are present to the connected conducting parts. For example, the contact area of the via hole 154 may be sized to provide sufficient conductivity between the pixel electrode 110 (such as a pixel electrode made of ITO) and the other conducting components of the pixel. In the depicted example, the square via hole 154 effectively serves as a limit on the length (and thus the area) of the aperture 150 since the black mask 88 is applied so as to cover the TFT 112 and square via hole 154.

In the depicted example, disclinations (i.e., regions in the liquid crystal layer 78 (FIG. 4) where the liquid crystals are not fully or properly aligned) may occur in the pixel viewing area defined by the black mask 88. In particular, disclinations may form in the liquid crystal layer in regions localized over the via hole and/or around the bottom edge of the pixel electrode 110 where the pixel electrode 110 includes various angular transitions that may distort an electric field generated by the pixel electrode 110. Such disclinations may reduce light transmission through the aperture 150 due to the poor alignment of the liquid crystals in these areas.

Turning now to FIG. 7, in one embodiment an elongated via hole 160 (i.e., a via hole having an elongated cross-section or contact area in the x and y dimensions), such as the depicted rectangular via hole 162, may be provided which is longer along one axis than along a perpendicular axis. In the depicted embodiment, the rectangular via hole 162 is longer along the x-axis and shorter along the y-axis than the square via hole 154 of FIG. 6. In certain embodiments, the elongated via hole 160 may be any via hole having a cross-section or contact area in the x and y dimensions that is not square.

In one embodiment, the contact area of the elongated via hole 160 is substantially the same as the contact area of a corresponding square via hole 154, thus providing substantially the same contact resistance for both via holes. In particular, as noted above, the contact area of the via hole may be selected so as to provide a specified conductivity between the pixel electrode 110, such as an ITO pixel electrode and other conductive structures connected to the TFT 112. Thus, in such an embodiment the elongated via hole 160 may be sized to as to provide a comparable or equivalent contact area (and corresponding conductivity) as an otherwise suitable square via hole 154.

For example, if a comparable square via hole were 6 μm×6 μm (for a contact area of 36 μm$^2$), a comparable elongated via hole 160 (such as the rectangular via hole 162) might be 9 μm (in the x-dimension)×4 μm (in the y-dimension) or 7.2 μm (in the x-dimension)×5 μm (in the y-dimension). Indeed, in such embodiments, the elongated via hole 160 may have any suitable dimensions in which the length along one axis (here the x-axis) is greater than the length along a perpendicular axis (here the y-axis) and in the which contact area of the elongated via hole is substantially the same as that in a corresponding square via hole 154.

As a consequence of the relative length of the elongated via hole 160 in the x-dimension, the elongated via hole 160 may be shorter in the y-dimension than a square via hole 154 having substantially the same contact resistance. Thus, the elongated via hole 160 is narrower in the y-dimension than a comparable square via hole 154 having comparable contact resistance. As a result, a lengthened aperture 168 (i.e., an aperture that is longer in the y-dimension) may be provided in pixels 60 employing an elongated via hole 160 relative to the aperture 150 provided in pixels employing a square via hole 154. That is, the narrowness or thinness of the elongated via hole 160 in the y-dimension (relative to a square via hole 154) allows the use of a lengthened aperture 168 that extends further in the y-dimension before being limited by the placement of the elongated via hole 160.

For example, in one embodiment, the aperture 150 employed with a 6 μm×6 μm square via hole 154 may measure approximately 14.2 μm×41 μm while a lengthened aperture 168 employed with a 9 μm×4 μm rectangular via hole 162 may measure approximately 14.2 μm×43 μm. Similarly, a lengthened aperture 168 employed with a 7.2 μm×5 μm rectangular via hole 162 may measure approximately 14.2 μm×42 μm. Because a lengthened aperture 168 has a comparable width but greater length than an aperture 150 employed with a square via hole 154, a lengthened aperture 168 has a greater area and therefore allows more light to be transmitted than an comparable aperture 150 employed with a square via hole 154.

In addition, in other embodiments the use of the elongated via hole 160 may provide other benefits. For example, in one embodiment, disclinations of liquid crystals which may be attributable to the presence of the via hole may be localized over the black mask 88 due to the reduction of the via hole in the y-dimension. Thus, in such an embodiment, the disclinations attributable to the presence of the elongated via hole 160 may be generally limited to an area which is already opaque, without substantially impacting the transmission of light through the aperture, i.e., viewing area, of the pixel 60.

While FIG. 7 depicts an elongated via hole 160 in the form of a rectangular via hole 162, in other embodiments the elongated via hole 160 may take other forms in which the length of the via hole along one axis exceeds the length along a perpendicular axis. For example, the elongated via hole 160 may be other forms of non-square via holes. Turning to FIG. 8, another example of such an elongated hole 160 is provided. In this example, the elongated via hole 160 is provided as an oval via hole 172 having a primary axis in the x-dimension and a shorter, secondary axis in the y-dimension. As with the rectangular via hole 162 discussed with respect to FIG. 7, the oval via hole 172 may be narrower in the y-dimension than a square via hole 154 while having a comparable contact area or contact resistance. Thus, embodiments employing an oval via hole 172 may also accommodate a lengthened aperture 168 relative to the aperture 150 that may be employed with a comparable square via hole 154.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A liquid crystal display (LCD) panel, comprising:
a backlight assembly capable of generating light;
a liquid crystal layer comprising a plurality of liquid crystals whose alignment is determined by a respective electric field, wherein the alignment of the liquid crystals determines the amount of light which passes through the liquid crystal layer from the backlight assembly; and
a thin film transistor (TFT) layer comprising a plurality of TFTs which, when operated, are capable of generating the respective electric fields, each TFT formed entirely within a respective elongated via hole associated with a respective pixel of the LCD panel, wherein the elongated via holes are longer in one dimension than in a perpendicular dimension within a cross-sectional plane corresponding to the plane of the TFT layer.

2. The LCD panel of claim 1, comprising an opaque mask layer at each pixel, wherein the opaque mask layer defines a light transmissive aperture over the liquid crystal layer at the respective pixel and wherein the opaque mask layer is sized to cover the respective elongated via hole at the respective pixel.

3. The LCD panel of claim 1, wherein the elongated via holes comprise one or more of rectangular via holes or oval via holes.

4. An electronic device, comprising:
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD comprises a plurality of pixels, each pixel comprising:
a liquid crystal layer comprising a plurality of liquid crystals whose alignment is determined by an electric field, wherein the alignment of the liquid crystals determines the amount of light which passes through the liquid crystal layer at the respective pixel; and
a thin film transistor (TFT) disposed entirely within an elongated via hole, wherein the operation of the TFT generated the electric field, wherein the elongated via holes are longer in one dimension than in a perpendicular dimension within a cross-sectional plane corresponding to the plane of the LCD.

5. A liquid crystal display (LCD) comprising a plurality of pixels, each pixel comprising:
a thin film transistor (TFT) disposed entirely within a rectangular via hole;
a liquid crystal layer, wherein alignment of a plurality of liquid crystals within the liquid crystal layer is determined by operation of the TFT; and
an opaque mask defining an aperture over the liquid crystal layer, wherein the opaque mask covers the rectangular via hole.

6. The LCD of claim 5, wherein each pixel comprises a backlight assembly capable of generating light which is modulated based on the alignment of the plurality of liquid crystals at the pixel.

7. The LCD of claim 5, wherein the thin film transistor comprises a source connected to a data line, a drain connected to a pixel electrode, and a gate connected to a scanning line.

8. The LCD of claim 5, wherein the rectangular via hole is about 9 µm×4 µm or about 7 µm×5 µm.

9. The LCD of claim 5, wherein the contact area provided by the rectangular via hole is about 36 µm².

10. The LCD of claim 5, wherein the LCD comprises a fringe field switched (FFS) LCD.

11. A liquid crystal display (LCD) comprising a plurality of pixels, each pixel comprising:
a non-square via hole housing a transistor, wherein the entire transistor is housed in the non-square via hole;
a plurality of liquid crystals whose alignment is determined by operation of the transistor; and
an opaque mask defining an aperture over the plurality of liquid crystals such that light may pass through the aperture if the plurality of liquid crystals is suitably aligned, wherein the opaque mask covers the non-square via hole.

12. The LCD of claim 11, wherein the non-square via hole is longer in one dimension than in a second, perpendicular dimension.

13. An electronic device, comprising
one or more input structures;
a storage structure encoding one or more executable routines;
a processor capable of receiving inputs from the one or more input structures and of executing the one or more executable routines when loaded in a memory; and
a liquid crystal display (LCD) capable of displaying an output of the processor, wherein the LCD comprises a plurality of pixels, each pixel comprising:
a via hole housing a transistor, wherein the via has a non-square contact area, and wherein the entire transistor is housed in the via hole;
a plurality of liquid crystals whose alignment is determined by operation of the transistor; and
an opaque mask defining an aperture over the plurality of liquid crystals, wherein the opaque mask covers the via hole.

14. A liquid crystal display (LCD) comprising a plurality of pixels, each pixel comprising:
a liquid crystal layer comprising a plurality of liquid crystals whose alignment determines the light transmission properties of the liquid crystal layer;
a thin film transistor (TFT) layer comprising a thin film transistor capable of affecting the alignment of the plurality of liquid crystals, wherein the TFT is housed within a via hole having an elongated contact area, and wherein a source electrode and a drain electrode of the TFT is housed within the via hole;
an opaque mask covering the via hole and defining an aperture through which light can pass, wherein the aperture defined by the opaque mask is larger in area than a comparable aperture which would be defined if the via hole had a square contact area and substantially the same amount of contact area.

15. The LCD of claim 14, comprising a backlight assembly capable of emitting light through the aperture and the plurality of liquid crystals when the plurality of liquid crystals is suitably aligned.

16. The LCD of claim 14, wherein the via hole has a rectangular or oval contact area.

17. A method of manufacturing a liquid crystal display (LCD) comprising a plurality of pixels, comprising:
forming a thin film transistor (TFT) in a via hole at each pixel, wherein each via hole has an elongated contact area, and wherein the entire TFT is formed within the via hole;
providing a liquid crystal layer at each pixel such that operation of each TFT affects the alignment of a plurality of liquid crystals at the respective pixel; and
providing an opaque mask defining an aperture over the liquid crystal layer at each pixel such that the respective via hole is covered by the opaque mask.

18. The method of claim 17, wherein each via hole has a rectangular or oval contact area.

* * * * *